(12) United States Patent
Isaac

(10) Patent No.: US 12,434,720 B2
(45) Date of Patent: Oct. 7, 2025

(54) KINETIC INSIGHTS MACHINE

(71) Applicant: ALLSTATE INSURANCE COMPANY, Northbrook, IL (US)

(72) Inventor: Emad Isaac, Downers Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 335 days.

(21) Appl. No.: 17/540,848

(22) Filed: Dec. 2, 2021

(65) Prior Publication Data
US 2022/0169266 A1    Jun. 2, 2022

Related U.S. Application Data

(60) Provisional application No. 63/120,334, filed on Dec. 2, 2020.

(51) Int. Cl.
| | |
|---|---|
| B60W 50/02 | (2012.01) |
| B60W 50/029 | (2012.01) |
| B60W 60/00 | (2020.01) |
| G06N 20/00 | (2019.01) |
| G07C 5/00 | (2006.01) |
| G07C 5/08 | (2006.01) |
| G08G 1/00 | (2006.01) |

(52) U.S. Cl.
CPC ...... *B60W 50/0205* (2013.01); *B60W 50/029* (2013.01); *B60W 60/001* (2020.02); *G06N 20/00* (2019.01); *G07C 5/008* (2013.01); *G07C 5/0808* (2013.01); *G07C 5/0825* (2013.01); *G08G 1/202* (2013.01); *G08G 1/205* (2013.01); *B60W 2050/021* (2013.01); *B60W 2050/0292* (2013.01); *B60W 2556/50* (2020.02)

(58) Field of Classification Search
CPC .......... B60W 50/0205; B60W 60/001; B60W 50/029; G06N 20/00
See application file for complete search history.

(56) References Cited

U.S. PATENT DOCUMENTS

| | | | |
|---|---|---|---|
| 11,794,759 B2 * | 10/2023 | Nielsen | G07C 5/008 |
| 2008/0177436 A1 * | 7/2008 | Fortson | G05B 23/0221 340/425.5 |
| 2017/0206718 A1 * | 7/2017 | Kapoor | G07C 5/0808 |
| 2017/0358151 A1 * | 12/2017 | Koons | G07C 5/08 |

(Continued)

*Primary Examiner* — Peter D Nolan
*Assistant Examiner* — Mikko Okechukwu Obioha
(74) *Attorney, Agent, or Firm* — Akerman LLP

(57) ABSTRACT

Aspects of the disclosure relate to computing platforms that utilize improved machine learning techniques to identify vehicle problems and control ancillary computing systems. A computing platform may receive vibration data corresponding to a vehicle component. Using one or more machine learning models and based on the vibration data, the computing platform may identify a vehicle problem corresponding to the vibration data. After identifying the vehicle problem, the computing platform may transmit one or more commands directing the autonomous vehicle control system to autonomously navigate a vehicle to a service facility, where transmitting the one or more commands directing the autonomous vehicle control system to autonomously navigate the vehicle to the service facility causes the autonomous vehicle control system to autonomously navigate the vehicle to the service facility.

21 Claims, 10 Drawing Sheets

(56) References Cited

U.S. PATENT DOCUMENTS

| | | | |
|---|---|---|---|
| 2021/0197702 A1* | 7/2021 | Krishnamurthi | G07C 5/0808 |
| 2021/0201598 A1* | 7/2021 | Im | G07C 5/008 |
| 2022/0138700 A1* | 5/2022 | Oehler | G07C 5/008 |
| | | | 705/305 |

* cited by examiner

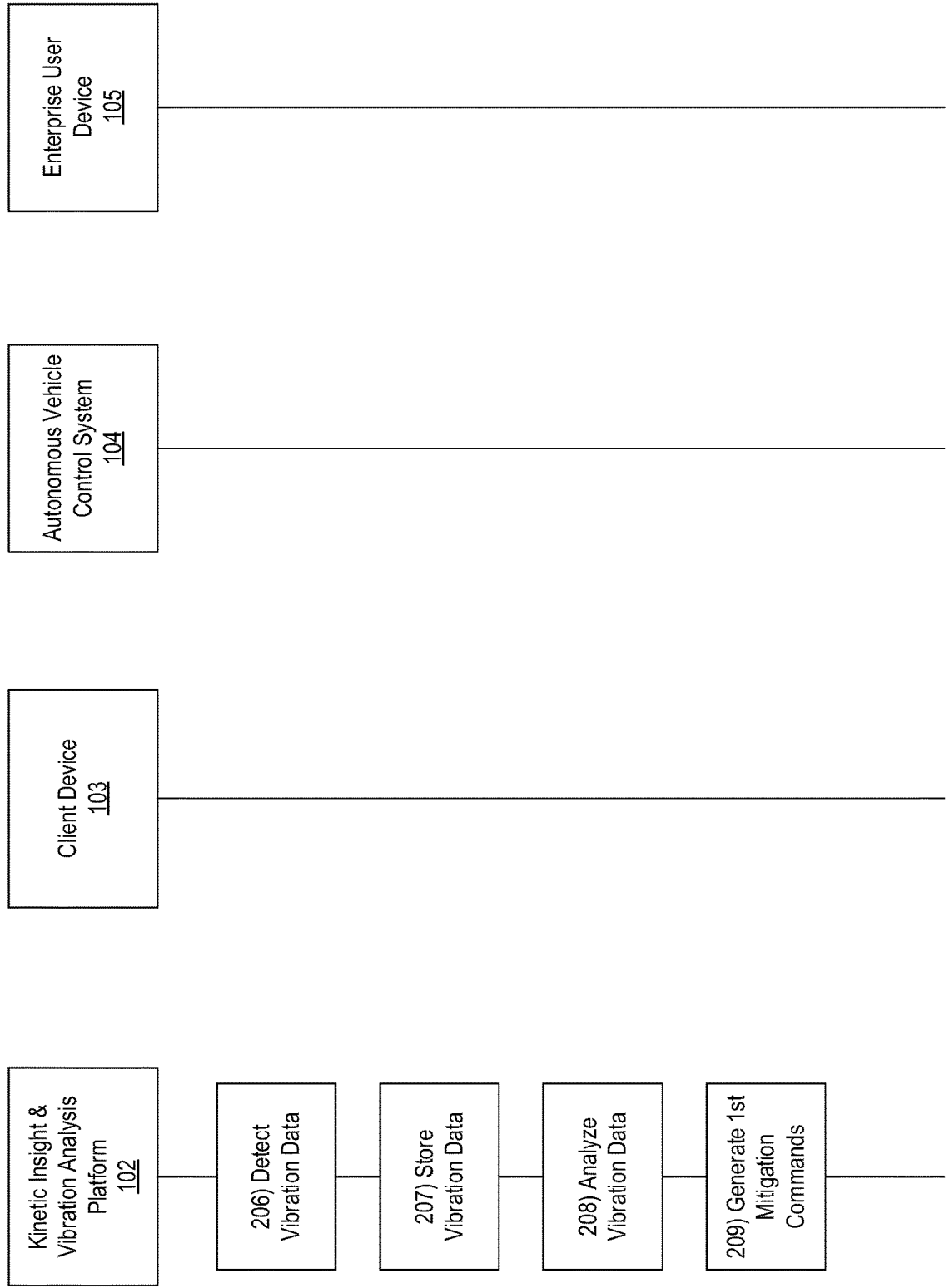

405

Enterprise User Interface

Please dispatch a service vehicle to the following location:

Latitude, Longitude

Problem Identified: Steering wheel out of alignment

Enterprise User Interface

Driving Profile for "Person #1"

Driving Score: 9/10

Enterprise User Interface

Recreation of Driving Event:

Based on the received data, breaks of the vehicle deteriorated and prevented the vehicle from stopping in time prior to the collision.

Client Interface

Please proceed to "Repair Shop" to have your lug nuts tightened. Click here for navigation.

Estimated Repair Cost: $10

It is estimated that at least one of the nuts will be displaced within the next 100 miles.

FIG. 7

KINETIC INSIGHTS MACHINE

CROSS-REFERENCE TO RELATED APPLICATION

This application is related to and claims priority under 35 U.S.C. § 119(e) from U.S. Patent Application No. 63/120,334, filed Dec. 2, 2020 and entitled "KINETICS INSIGHT MACHINE IMPLEMENTING VIBRATION ANALYSIS FOR ROADSIDE ASSISTANCE," the entire contents of which are incorporated herein by reference for all purposes.

TECHNICAL FIELD

Aspects of the present disclosure generally relate to systems and methods for vehicle performance analysis and, more specifically, the present disclosure relates to enhanced processing systems for executing machine learning algorithms for vibration analysis for providing roadside assistance.

BACKGROUND

Many organizations and individuals evaluate data to perform vehicle diagnosis. In many instances, however, such data might not be representative of all vehicle components, which may lead to inaccurate diagnosis and/or vehicle failures resulting from unidentified problems. Furthermore, such evaluation may be performed at backend servers, which may result in delayed response times and network bandwidth congestion.

SUMMARY

Aspects of the present disclosure include a computing device comprising at least one processor, a communication interface communicatively coupled to the at least one processor, and memory storing computer-readable instructions. When the instructions are executed by the at least one processor, the computing device may receive vibration data corresponding to a vehicle component, identify, using one or more machine learning datasets and based on the vibration data, a vehicle problem corresponding to the vibration data, and transmit, after identifying the vehicle problem and to an autonomous vehicle control system, one or more first commands directing the autonomous vehicle control system to autonomously navigate a vehicle based on the identified vehicle problem, wherein transmitting the one or more first commands causes the autonomous vehicle control system to autonomously navigate the vehicle based on the one or more first commands.

Other aspects of the present disclosure include a method comprising, at a computing device comprising at least one processor, a communication interface, and memory, receiving vibration data corresponding to a vehicle component, identifying, using one or more machine learning datasets and based on the vibration data, a vehicle problem corresponding to the vibration data, and transmitting, after identifying the vehicle problem and to an enterprise user device corresponding to a service facility, one or more first commands directing the enterprise user device to cause display of a user interface indicating a re-creation of a vehicle event, wherein transmitting the one or more first commands directing the enterprise user device to cause display of the user interface indicating the re-creation of the vehicle event causes the enterprise user device to cause display of the user interface indicating the re-creation of the vehicle event, wherein the re-creation of the vehicle event is determined based on the vibration data and the vehicle problem.

Yet other aspects of the present disclosure include one or more non-transitory computer-readable media storing instructions. When such instructions are executed by a computing platform comprising at least one processor, a communication interface, and memory, the computing platform receives vibration data corresponding to a vehicle component, identifies, using one or more machine learning datasets and based on the vibration data, a vehicle problem corresponding to the vibration data, and transmits, to a client device and after identifying the vehicle problem, one or more commands directing the client device to cause display of a user interface. The user interface may indicate one or more of a nearest service facility, an estimated repair cost, or an estimated time to failure for the vehicle component, wherein transmitting the one or more commands directing the client device to cause display of the user interface causes the client device to cause display of the user interface.

BRIEF DESCRIPTION OF THE DRAWINGS

FIGS. 2A-2E depict an illustrative event sequence for implementing improved machine learning techniques for on-board vehicle diagnostics and ancillary device control.

FIGS. 4-7 depict illustrative user interfaces for implementing improved machine learning techniques for on-board vehicle diagnostics and ancillary device control.

DETAILED DESCRIPTION

Figure 1A:
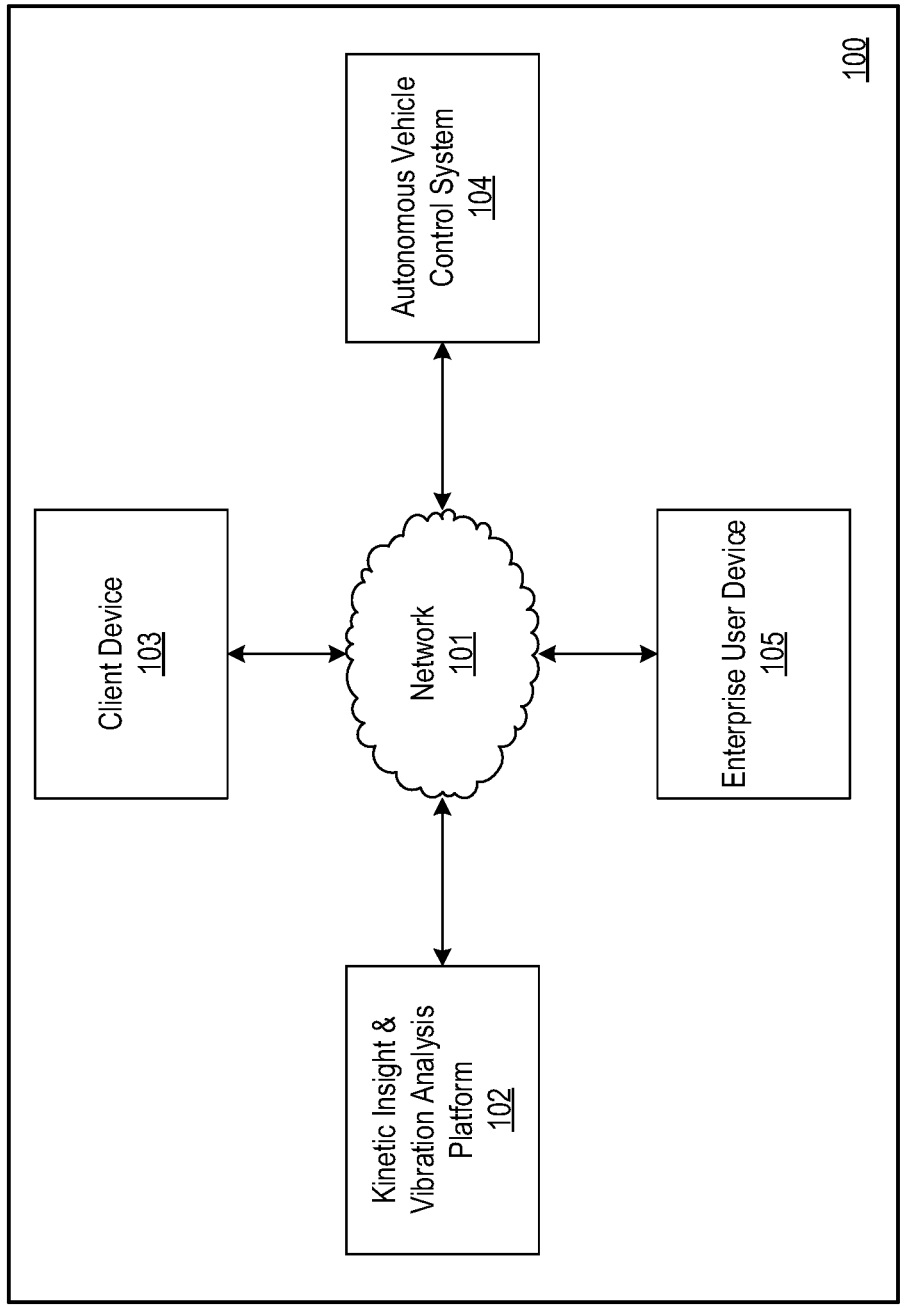
FIGS. 1A-1B depict an illustrative computing environment for implementing improved machine learning techniques for on-board vehicle diagnostics and ancillary device control.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosure provide effective, efficient, scalable, and convenient technical solutions that address and overcome the technical problems associated with identifying vehicle problems using vibration and/or frequency data and controlling ancillary computing systems in response. In accordance with one or more arrangements discussed herein, a computing platform having at least one processor, a communication interface, and memory may receive vibration data corresponding to a vehicle component. Using one or more machine learning datasets and based on the vibration data, the computing platform may identify a vehicle problem corresponding to the vibration data. After identifying the vehicle problem, the computing platform may transmit, to an autonomous vehicle control system, one or more first commands directing the autonomous vehicle control system to autonomously navigate a vehicle to a service facility, which may cause the autonomous vehicle control system to autonomously navigate the vehicle to the service facility.

In one or more instances, the computing platform may receive frequency-based data corresponding to the vehicle component, wherein the vehicle problem is identified based, at least in part, on the frequency-based data. In one or more instances, the vehicle component might not be monitored by an electrical sensor. In one or more instances, the computing platform may be located in a fixed, stationary location on the vehicle, and may be powered by the vehicle.

In one or more examples, the computing platform may receive, from one or more vehicle sensors of the vehicle, telematics data, and may identify the vehicle problem based, at least in part, on the telematics data. In one or more instances, the computing platform may identify a service facility based on one or more of a proximity of the service facility to a vehicle corresponding to the vehicle component or a capability of the service facility to address the vehicle problem.

In one or more arrangements, the computing platform may transmit, to an enterprise user device corresponding to the service facility, one or more second commands directing the enterprise user device to cause display of a user interface indicating a re-creation of a vehicle event, which may cause the enterprise user device to cause display of the user interface indicating the re-creation of the vehicle event. In these instances, the re-creation of the vehicle event may be determined based on the vibration data. In one or more instances, the computing platform may update the one or more machine learning datasets based on the vibration data and the vehicle problem.

In one or more instances, the computing platform may be embodied on any type of integrated circuit (IC) device, such as a microchip, application specific integrated circuit (ASIC), field programmable gate array (FPGA), system on a chip (SOC), microprocessor, microcontroller, and the like. The IC device may be included on or otherwise associated with the vehicle for which vibration data is analyzed. The IC device may perform any of the operations of the computing platform. Thus, although some embodiments discussed herein transmit data and/or analysis to one or more other computing devices, such as the enterprise user device, any or all of the operations of the enterprise user device, client device, or vehicle control systems may be performed on a single IC device of the computing platform.

In one or more instances, the computing platform may receive vibration data corresponding to a vehicle component. Using one or more machine learning datasets and based on the vibration data, the computing platform may identify a vehicle problem corresponding to the vibration data. After identifying the vehicle problem, the computing platform may transmit one or more first commands to an enterprise user device corresponding to a service facility directing the enterprise user device to cause display of a user interface indicating a re-creation of a vehicle event, which may cause the enterprise user device to cause display of the user interface indicating the re-creation of the vehicle event. In these instances, the re-creation of the vehicle event may be determined based on the vibration data and the vehicle problem.

In one or more example arrangements, the user interface may further indicate a driving score of a driver of a vehicle corresponding to the vehicle component or a location of the vehicle. In one or more instances, the one or more first commands may further cause the enterprise user device to autonomously dispatch a service vehicle, which may be configured to autonomously navigate to a location of a vehicle corresponding to the vehicle component.

In one or more instances, the computing platform may receive frequency-based data corresponding to the vehicle component, and may identify the vehicle problem based, at least in part, on the frequency-based data. In one or more instances, the vehicle component might not be monitored by an electrical sensor.

In one or more instances, the computing platform may receive telematics-based data corresponding to the vehicle component, and may identify the vehicle problem based, at least in part, on the telematics-based data. In one or more instances, the vehicle component might not be monitored by an electrical sensor, audio sensor, movement sensor, vision sensor, and the like.

In one or more examples, the computing platform may be located in a fixed, stationary location on a vehicle corresponding to the vehicle component and may be powered by the vehicle. In one or more instances, the computing platform may receive, from one or more vehicle sensors of the vehicle, telematics data, and may identify the vehicle problem based, at least in part, on the telematics data.

In one or more arrangements, the computing platform may identify the service facility, which may be closer to the vehicle than other service facilities. In one or more instances, the computing platform may transmit, to an autonomous vehicle control system, one or more second commands directing the autonomous vehicle control system to autonomously navigate a vehicle to the service facility, which may cause the autonomous vehicle control system to autonomously navigate the vehicle to the service facility.

In one or more instances, the computing platform may transmit, to a client device, one or more second commands directing the client device to cause display of a user interface indicating one or more of: a nearest service facility, an estimated repair cost, or an estimated time to failure for the vehicle component, which may cause the client device to cause display of the user interface. In one or more instances, the computing platform may update the one or more machine learning datasets based on the vibration data and the vehicle problem.

In one or more instances, the computing platform may receive vibration data corresponding to a vehicle component. Using one or more machine learning datasets and based on the vibration data, the computing platform may identify a vehicle problem corresponding to the vibration data. After identifying the vehicle problem, the computing platform may transmit, to a client device, one or more commands directing the client device to cause display of a user interface indicating one or more of: a nearest service facility, an estimated repair cost, or an estimated time to failure for the vehicle component, which may cause the client device to cause display of the user interface.

In one or more instances, the computing platform may receive telematics data corresponding to a vehicle component. Using one or more machine learning datasets and based on the telematics data, the computing platform may identify a vehicle problem corresponding to the telematics data. After identifying the vehicle problem, the computing platform may transmit, to a client device, one or more commands directing the client device to cause display of a user interface indicating one or more of: a nearest service facility, an estimated repair cost, or an estimated time to failure for the vehicle component, which may cause the client device to cause display of the user interface.

In one or more instances, a remote, ASIC-based (or other IC device) computing system in which all edge-based activities may sensed (movement, vehicle information, driving information) and monitored on the ASIC is provided. The computing system performs computations for triggering events and transmits to a central server specific events as needed. For example, for collision sensing, the computing system may perform analysis on the vehicle itself, including vehicle dynamics. The computing system may perform all computations on board, immediately, to determine probabilities of an event and/or recreate the event. In addition, the computing system may contact roadside assistance and emergency services.

In one or more instances, the remote, computing system may determine potential performance issues with a vehicle. Typical existing sensing systems (e.g., OBD, tire pressure monitor, etc.) often miss such issues, a flat tire, transmission issues, brake issues, or that the wheel alignment is off. By learning sensed fingerprints (telematics/vibration/frequency-based) indicating such an event, the computing system provides potential failure analysis and can provide alerts/recommendations to address issue. For example, if the wheel alignment is off, the system may determine that a user is repeatedly adjusting the steering wheel. A sensor associated with the steering wheel may provide the sensed data to the computing system for analysis and determination of a vehicle condition. An insurance application can be based on an issue being detected and the user's response in addressing the issue.

These features, along with many others, are discussed in greater detail below.

As a brief summary, the description herein provides systems and methods for leveraging machine learning techniques to identify vehicle problems based on detected vibration and/or frequency data and to perform ancillary device control functions based on the identified vehicle problems. In short, a KIM (Kinetic insightss Machine) is described that may analyze vehicle dynamics at a vehicle itself. This KIM may immediately perform all computation on board, determine a probability that a vehicle event occurred, and/or re-create an event for further analysis. KIM may perform computations on board a vehicle with additional data inputs. In some instances, KIM may immediately reach out to roadside assistance and emergency services and may trigger a first notice of loss. In some instances, the base technology for KIM may be an application specific integrated circuit (ASIC), field programmable gate array (FPGA), or the like. In some instances, KIM may determine potential issues with a vehicle. Often, a user may sense that there is something just not right with a vehicle. Typical existing sensing systems (e.g., OBD, tire pressure monitor, etc.) may not indicate that there are transmission issues, brake issues, that the wheel alignment is off, or the like as these subsystems may not be sensed by certain conventional arrangements. However, these potential issues may have fingerprints (vibration/frequency-based) indicating presence thereof or events relating thereto. The KIM system may provide potential failure analysis, alerts/recommendations to address an issue, or the like.

In doing so, one or more of the systems and methods described herein may improve vehicle diagnostic capabilities. For example, KIM may increase processing speed of vehicle diagnosis by performing local computations to identify vehicle problems rather than, or in addition to, transmitting signals to a backend server for computation. Furthermore, KIM may improve accuracy of vehicle diagnosis by utilizing vibration and/or frequency data for analysis. For example, KIM may be able to identify potential issues based on vibration/frequency-based data (e.g., transmission issues, brake issues, wheel alignment issues, or the like) that might not be recognized by typical sensing systems (e.g., on board diagnostics (OBD), tire pressure monitor, or the like).

Figure 1B:
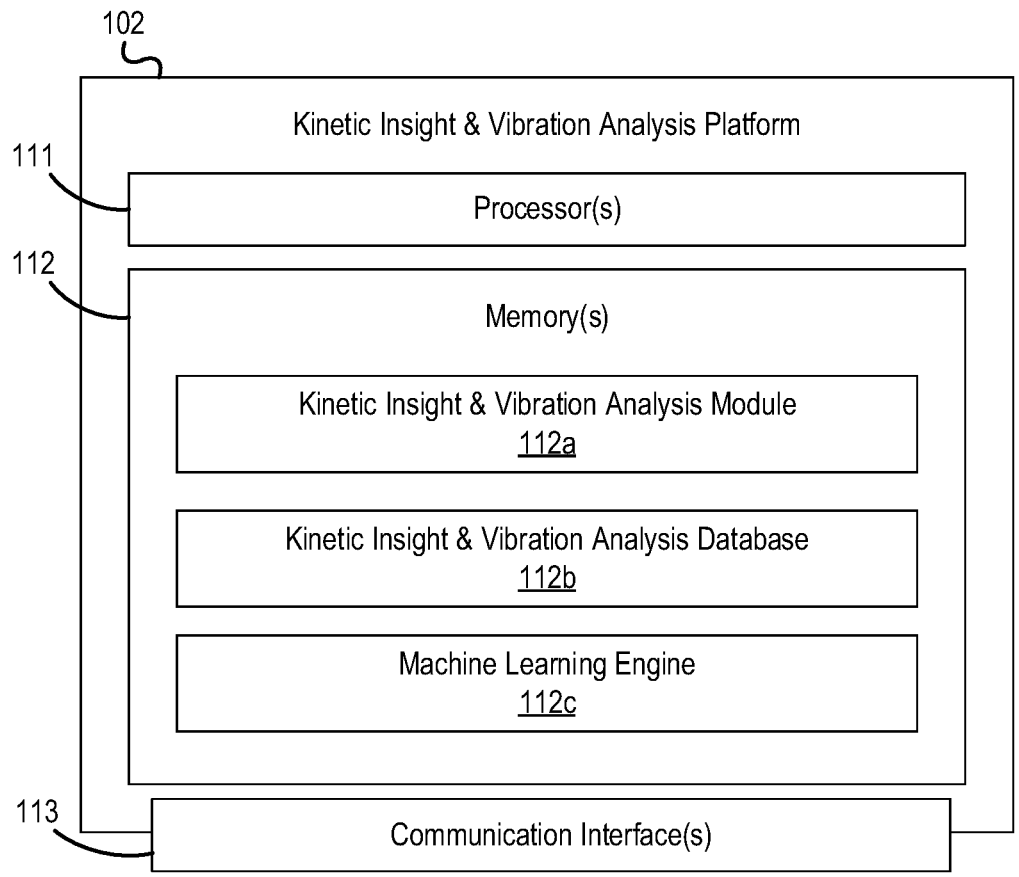

FIGS. 1A and 1B depict an illustrative computing environment for implementing improved machine learning techniques for on-board vehicle diagnostics and ancillary device control in accordance with one or more example embodiments. Referring to FIG. 1A, computing environment 100 may include one or more computer systems. For example, computing environment 100 may include kinetic insights and vibration analysis platform 102, client device 103, autonomous vehicle control system 104, and enterprise user device 105.

As illustrated in greater detail below, kinetic insights and vibration analysis platform 102 may include one or more edge computing devices configured to perform one or more of the functions described herein. For example, kinetic insights and vibration analysis platform 102 may include one or more computing devices (e.g., ASIC based computing systems, FPGA based computing systems, sensor devices, or the like). In one or more instances, kinetic insights and vibration analysis platform 102 may be configured to detect telematics, vibration, and/or frequency data at a vehicle and maintain one or more machine learning models and/or to perform machine learning techniques to analyze the detected vibration and/or frequency data for vehicle diagnostics. In some instances, the kinetic insights and vibration analysis platform 102 may be configured to dynamically tune the machine learning models and/or algorithms as additional data is detected and analyzed. In one or more examples, the kinetic insights and vibration analysis platform 102 may be located at a vehicle and configured to perform data collection and analysis locally at the vehicle. In some instances, the kinetic insights and vibration analysis platform 102 may be powered by the vehicle itself rather than a separate power source (e.g., a battery), and may be located in a fixed, stationary position at the vehicle. In some instances, the kinetic insights and vibration analysis platform 102 may be configured to monitor vehicle components that are not otherwise monitored by electrical sensors, audio sensors, movement sensors, or any other sensor to detect a condition of an environment. In some instances, the kinetic insights and vibration analysis platform 102 may be integrated into an existing on-board computing device. In other instances, the kinetic insights and vibration analysis platform 102 may be an independent computing device.

Client device 103 may be a computing device (e.g., a smart phone, a tablet, on board vehicle screen, laptop, or the like) that may be used by, for example, a driver/customer of an enterprise organization, such as an insurance company. It should be understood that client device 103 is not necessarily usable exclusively by a customer of an insurance company. Rather, client device 103 may be a user device configured for use by a variety of users. In one or more instances, the client device 103 may be a computing device configured to receive information (e.g., kinetic insights and vibration analysis platform 102) and to generate/display one or more graphical user interfaces (which may include, e.g., recommended service facilities, navigational directions, estimated repair costs, estimated time to failure for a vehicle component, or the like) accordingly.

Autonomous vehicle control system 104 may be a computing system integrated into a vehicle (e.g., a personal vehicle, a service vehicle, or the like), and may be used to control operations of the vehicle in an autonomous manner. In some instances, the autonomous vehicle control system 104 may be configured to communicate with the kinetic insights and vibration analysis platform 102 and may perform one or more autonomous vehicle control operations in response to information received from the kinetic insights and vibration analysis platform 102.

Enterprise user device 105 may be one or more computing devices (e.g., laptop computers, desktop computers, servers, server blades, or the like) that may be used (e.g., by a representative of an organization such as an insurance company, an employee of a repair service, or the like) to perform vehicle diagnostics, driver evaluation, service dispatch, or the like. It should be understood that enterprise user device 105 is not necessarily usable exclusively by a representative of an insurance company or repair service employee. Rather, enterprise user device 105 may be a user device configured for use by a variety of users. In one or more instances, the enterprise user device 105 may be a computing device configured to receive information (e.g., from the kinetic insights and vibration analysis platform 102, or the like) and to generate/display graphical user interfaces (which may include, e.g., dispatch instructions, driving scores, diagnostic information, or the like) accordingly.

Computing environment 100 also may include one or more networks, which may interconnect one or more of kinetic insights and vibration analysis platform 102, client device 103, autonomous vehicle control system 104, enterprise user device 105, or the like. For example, computing environment 100 may include a network 101 (which may, e.g., interconnect kinetic insights and vibration analysis platform 102, client device 103, autonomous vehicle control system 104, enterprise user device 105, or the like).

In one or more arrangements, kinetic insights and vibration analysis platform 102, client device 103, autonomous vehicle control system 104, enterprise user device 105, and/or the other systems included in computing environment 100 may be a single computing device capable of and configured for receiving a user interface, receiving input using the user interface, and communicating the received input to one or more other computing devices. For example, kinetic insights and vibration analysis platform 102, client device 103, autonomous vehicle control system 104, enterprise user device 105, and/or the other systems included in computing environment 100 may, in some instances, be and/or include server computers, desktop computers, laptop computers, tablet computers, smart phones, sensors, or the like that may include one or more processors, memories, communication interfaces, storage devices, and/or other components. As noted above, and as illustrated in greater detail below, any and/or all of kinetic insights and vibration analysis platform 102, client device 103, autonomous vehicle control system 104, and enterprise user device 105 may, in some instances, be special-purpose computing devices configured to perform specific functions.

Further still, the kinetic insights and vibration analysis platform 102, client device 103, autonomous vehicle control system 104, enterprise user device 105, and/or the other systems included in computing environment 100 may be embodied on a type of integrated circuit (IC) device, such as a microchip, application specific integrated circuit (ASIC), field programmable gate array (FPGA), system on a chip (SOC), microprocessor, microcontroller, and the like. The IC device may be included on or otherwise associated with the vehicle for which vibration data is analyzed. The IC device may perform any of the operations of the computing platform 100 discussed herein, with or without the use of network 101 to communicate with other components. For example, kinetic insights and vibration analysis platform 102 and enterprise user device 105 may perform the operations described herein, but may be embodied within a microcontroller integrated with the vehicle. Thus, although some embodiments discussed herein transmit data and/or analysis to one or more other components, any or all of the operations of the kinetic insights and vibration analysis platform 102, enterprise user device 105, client device 103, or vehicle control systems 104 may be performed on a single IC device of the computing platform Referring to FIG. 1B, kinetic insights and vibration analysis platform 102 may include one or more processors 111, memory 112, and communication interface 113. A data bus may interconnect processor 111, memory 112, and communication interface 113. Communication interface 113 may be a network interface configured to support communication between kinetic insights and vibration analysis platform 102 and one or more networks (e.g., network 101, or the like). Memory 112 may include one or more program modules having instructions that when executed by processor 111 cause kinetic insights and vibration analysis platform 102 to perform one or more functions described herein and/or one or more databases that may store and/or otherwise maintain information which may be used by such program modules and/or processor 111. In some instances, the one or more program modules and/or databases may be stored by and/or maintained in different memory units of kinetic insights and vibration analysis platform 102 and/or by different computing devices that may form and/or otherwise make up kinetic insights and vibration analysis platform 102. For example, memory 112 may have, store, and/or include kinetic insights and vibration analysis module 112a, kinetic insights and vibration analysis database 112b, and a machine learning engine 112c. Kinetic insights and vibration analysis module 112a may have instructions that direct and/or cause kinetic insights and vibration analysis platform 102 to execute advanced machine learning techniques for analyzing vehicle diagnostics, as discussed in greater detail below. Kinetic insights and vibration analysis database 112b may store information used by kinetic insights and vibration analysis module 112a and/or kinetic insights and vibration analysis platform 102 in analyzing vehicle diagnostics and/or in performing other functions. Machine learning engine 112c may have instructions that direct and/or cause the kinetic insights and vibration analysis platform 102 to perform evaluations of device quality, and to set, define, and/or iteratively refine optimization rules and/or other parameters used by the kinetic insights and vibration analysis platform 102 and/or other systems in computing environment 100.

Figure 2A:
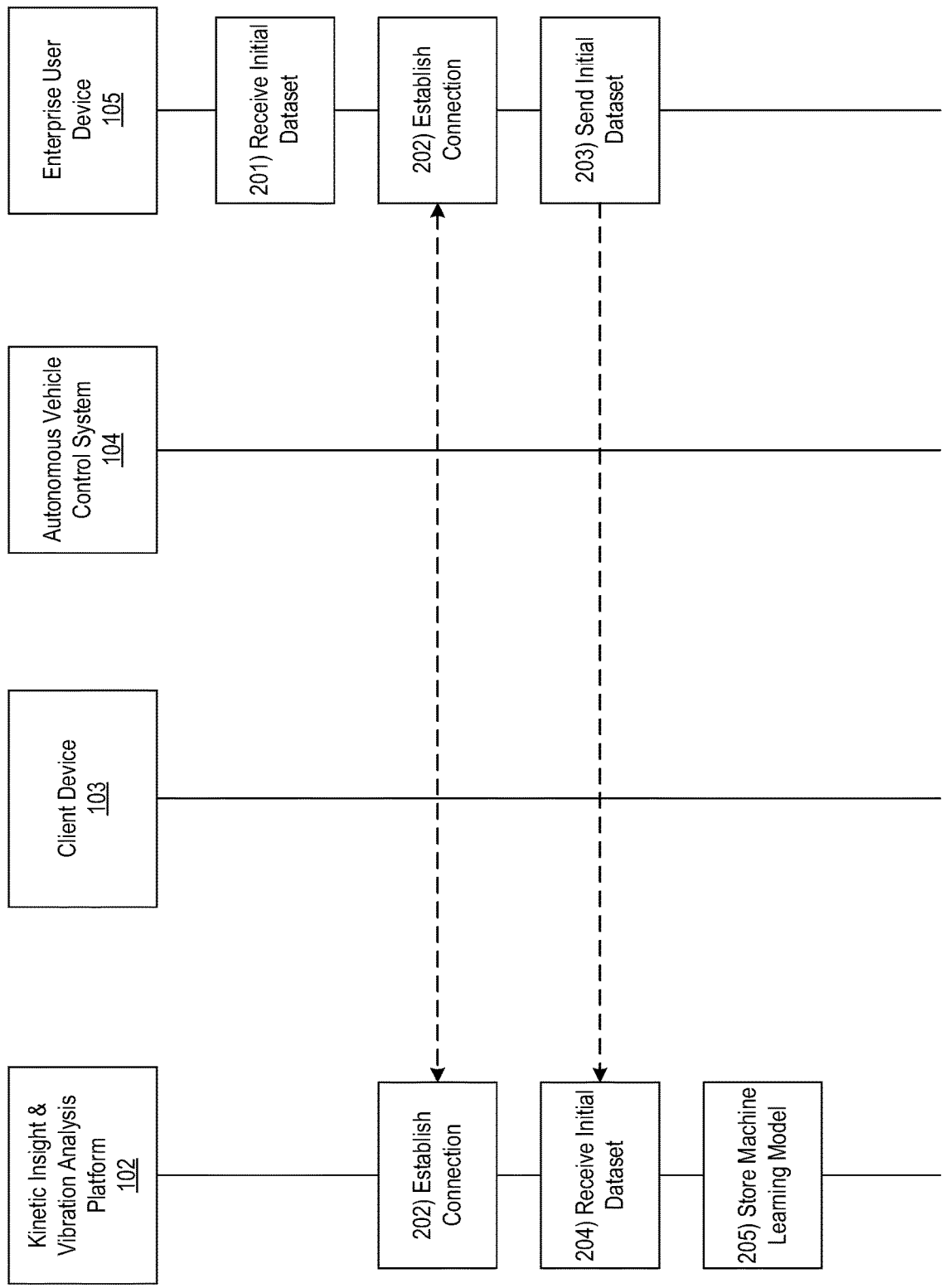

FIGS. 2A-2E depict an illustrative event sequence for implementing improved machine learning techniques for on-board vehicle diagnostics and ancillary device control in accordance with one or more example embodiments. Referring to FIG. 2A, at step 201, the enterprise user device 105 may generate and/or receive an initial dataset. For example, the enterprise user device 105 may receive vibration data, frequency data, or the like and corresponding vehicle problems identified with the data. In some instances, the enterprise user device 105 may generate one or more data ranges for vehicle components (e.g., low and high thresholds for each component) that define an acceptable operational data range for the vehicle components. In some instances, the enterprise user device 105 may receive user input via the display of the enterprise user device 105 corresponding to the vehicle problems identified for particular data. For example, an employee of a service repair shop may identify the vehicle problem and may input a correlation between identified data and the vehicle problem. Still further, certain fingerprints (vibration/frequency-based) may be known as indicating specific and/or general vehicle problems, features, and/or events. In generating and/or receiving the initial dataset, the enterprise user device 105 may compile a dataset that may be used to initially train a machine learning model.

At step 202, the enterprise user device 105 may establish a connection with the kinetic insights and vibration analysis platform 102. For example, the enterprise user device 105 may establish a first wireless data connection with the kinetic insights and vibration analysis platform 102 to link the enterprise user device 105 to the kinetic insights and vibration analysis platform 102 (e.g., in preparation for transmitting the initial dataset to the kinetic insights and vibration analysis platform 102). In some instances, the enterprise user device 105 may identify whether a connection is already established with the kinetic insights and vibration analysis platform 102. If a connection is already established with the kinetic insights and vibration analysis platform 102, the enterprise user device 105 might not re-establish the connection. If a connection is not yet established with the kinetic insights and vibration analysis platform 102, the enterprise user device 105 may establish the first wireless data connection as described herein. In still other instances, the kinetic insights and vibration analysis platform 102 and the enterprise user device 105 may be included in the same computing device or chip such that establishing a connection between the two components may not be necessary.

At step 203, the enterprise user device 105 may transmit the initial dataset, generated at step 201, to the kinetic insights and vibration analysis platform 102. In some instances, the enterprise user device 105 may transmit the initial dataset to the kinetic insights and vibration analysis platform 102 while the first wireless data connection is established.

At step 204, the kinetic insights and vibration analysis platform 102 may receive the initial dataset from the enterprise user device 105. In some instances, the kinetic insights and vibration analysis platform 102 may receive the initial dataset via the communication interface 113 and while the first wireless data connection is established. Additionally or alternatively, the kinetic insights and vibration analysis platform 102 may generate the initial dataset (e.g., based on detected frequency/vibration data and manually identified vehicle problems).

At step 205, the kinetic insights and vibration analysis platform 102 may store a machine learning model based on the initial dataset received at step 204. For example, the kinetic insights and vibration analysis platform 102 may store various vibration and/or frequency data, and previously identified vehicle problems corresponding to the data, which may be used to identify correlations between vehicle problems and vibration/frequency data.

Referring to FIG. 2B, at step 206, the kinetic insights and vibration analysis platform 102 may detect vibration and/or frequency data at a vehicle into which the kinetic insights and vibration analysis platform 102 is integrated. For example, the kinetic insights and vibration analysis platform 102 may detect vibration data of a vehicle component that is not otherwise monitored by an electrical sensor (e.g., steering wheel alignment, wear on brakes, wear on transmission, tire pressure, wear on shocks, tightness of lug nuts, or the like).

At step 207, the kinetic insights and vibration analysis platform 102 may store the vibration/frequency data for future re-creation of a driving event. For example, the kinetic insights and vibration analysis platform 102 may act as a "black box" that may be used by repair service employees or the like to piece together and/or automatically re-create a driving event (e.g., to determine what happened before, during, and after a driving event). More particularly, the enterprise user device 105 of the kinetic insight and vibration analysis platform 102 may store the vibration/frequency data for any number of components of the vehicle over a period of time, which may include a vehicle event such as a crash or breakdown of the vehicle. The vibration/frequency data may then be retrieved by the kinetic insight and vibration analysis platform 102 or enterprise user device 105 and re-played over the period of time to determine one or more aspects of the vibration/frequency data that may have contributed to the vehicle event. For example, particular vibration/frequency data may be collected for a period of time before a lug nut of the vehicle is shaken loose. Through a re-creation of the vibration/frequency data prior to losing the lug nut, the kinetic insights and vibration analysis platform 102 may determine a fingerprint of vibration/frequency data that indicates a loose lug nut such that future identification of the same vehicle event may be determined. As above, such analysis may be performed through a combination of components communicating over a network or by a single computing device or microcontroller integrated with the vehicle.

In some instances, the vehicle event may include a crash of the vehicle potentially due to a mechanical failure of a component of the vehicle that is indicated by the vibration/frequency data of the vehicle and the machine learning techniques described herein. For example, any data may be obtained and stored (either by the kinetic insights and vibration analysis platform 102, client device 103, and/or the enterprise user device 105) of the operation of the vehicle prior to a crash incident of the vehicle. Such data may include telematics data and/or vibration/frequency data. Telematics data may include, but is not limited to, acceleration data, speed data, braking data, heading data, geographic data, impact data, data identifying the vehicle and/or passengers, Global Positioning System (GPS) data, on-board diagnostics (OBD), and/or any other data as appropriate. The obtained telematics data can also include data captured using multiple telematics devices and/or telematics devices associated with other vehicles and/or locations proximate to the vehicle, such as a GPS-configured unit, a mobile device, OBD-configured devices, and the like. The telematics data can include a subset and/or an aggregation of raw sensor data captured using the sensors associated with the telematics device. In a variety of embodiments, the telematics data includes a stream of raw sensor data captured using the telematics device. Such data may be obtained for any period of time prior to the vehicle event and re-created to form a fingerprint of vehicle operation prior to the crash. The re-creation may include an indication that the period of time led up to and/or included the vehicle event of the crash. As above, this fingerprint or other information concerning the detected vehicle event may be used to improve or teach the machine learning algorithm for predicting the occurrence of an event based on the telematics data and/or vibration/frequency data.

At step 208, the kinetic insights and vibration analysis platform 102 may analyze the vibration/frequency data using the machine learning model to identify a vehicle problem. For example, the kinetic insights and vibration analysis platform 102 may detect vibration at a lug nut on the front left wheel and may determine that the lug nut is looser than it should be and tightened in response. As other examples, the kinetic insights and vibration analysis platform 102 may detect vibration or other frequency data at the vehicle and may identify, based on the vibration and/or frequency data and using the machine learning model, that other mechanical vehicle components not otherwise monitored by an electrical sensor, are causing a vehicle problem (the steering wheel is out of alignment and should be adjusted, brakes should be replaced/adjusted, transmission should be replaced/adjusted, tire pressure should be adjusted/a flat tired should be replaced, shocks should be replaced/adjusted, a vehicle software update should be reinstalled, or the like). In some instances, in addition to the frequency and/or vibration data, the kinetic insights and vibration analysis platform 102 may use other data such as telematics data, vehicle information, third party data, or the like to identify the vehicle problem.

In some instances, the kinetic insights and vibration analysis platform 102 might not be able to recognize the vibration and/or frequency data and might not be able to identify the vehicle problem accordingly. In these instances, the kinetic insights and vibration analysis platform 102 may direct the client device 103 to display a graphical user interface, alert, notification, or the like indicating that the vehicle should be manually examined, which may cause the client device 103 to display the graphical user interface accordingly.

At step 209, after identifying the vehicle problem at step 208, the kinetic insights and vibration analysis platform 102 may generate one or more first mitigation commands. For example, the kinetic insights and vibration analysis platform 102 may generate one or more commands directing enterprise user device 105 to perform one or more actions (e.g., dispatch a service vehicle, display a driving score, display a re-creation of a vehicle event, display the vehicle problem, or the like) based on the vibration and/or frequency data.

Figure 2C:
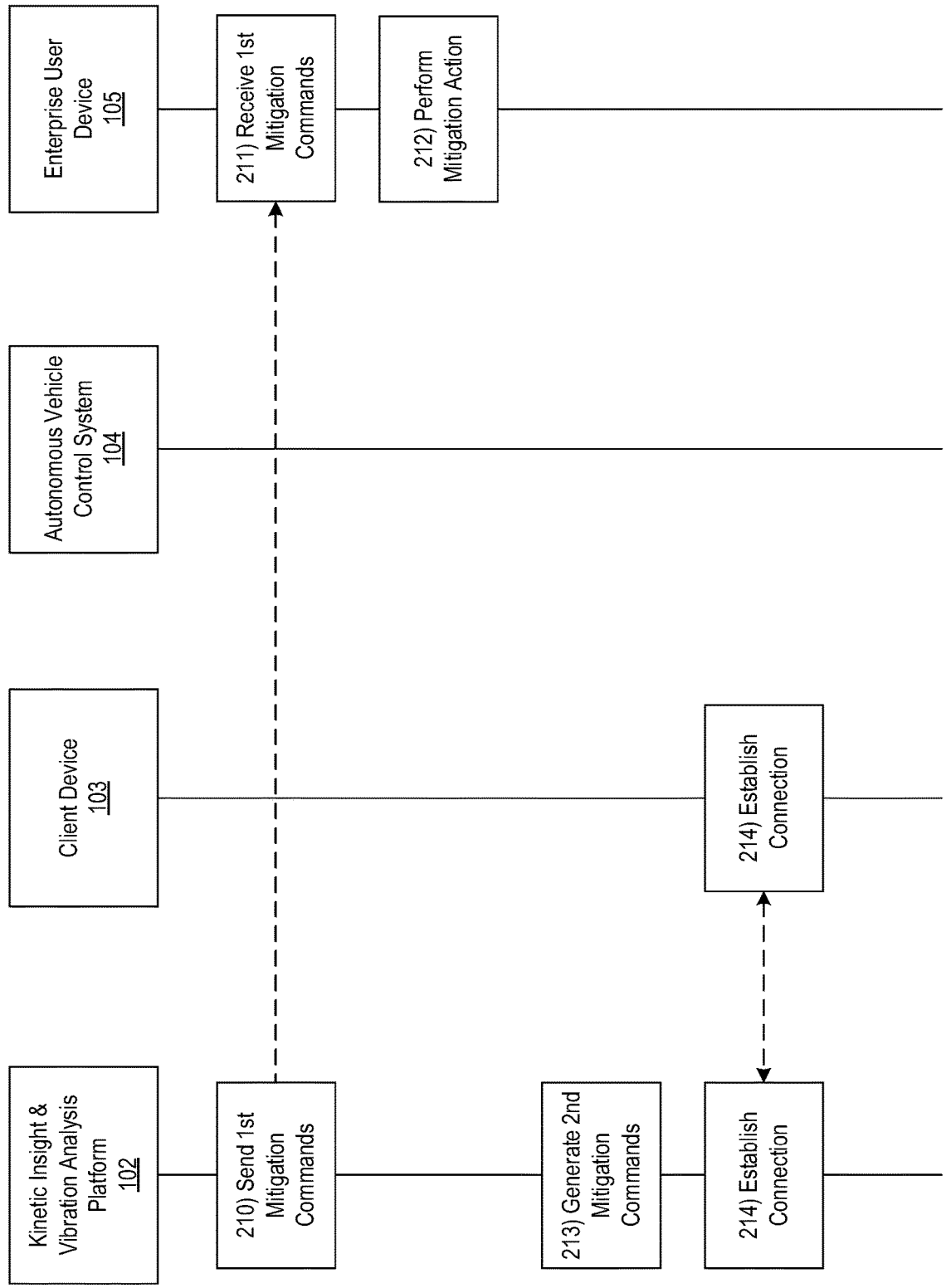

Referring to FIG. 2C, at step 210, the kinetic insights and vibration analysis platform 102 may transmit the one or more first mitigation commands to enterprise user device 105. In one or more instances, the kinetic insights and vibration analysis platform 102 may transmit the one or more first mitigation commands to the enterprise user device 105 via the communication interface 113 and while the first wireless data connection is established.

At step 211, the enterprise user device 105 may receive the one or more first mitigation commands sent at step 210. In one or more instances, the enterprise user device 105 may receive the one or more first mitigation commands while the first wireless data connection is established.

At step 212, the enterprise user device 105 may perform a mitigation action in response to the one or more first mitigation commands received at step 211. For example, the enterprise user device 105 may be a service dispatch platform that dispatches service vehicles to a location of the vehicle corresponding to the kinetic insights and vibration analysis platform 102. In these instances, the enterprise user device 105 may display one or more graphical user interfaces indicating that a service vehicle should be dispatched (e.g., which may, in some instances, be similar to graphical user interface 405, which is shown in FIG. 4 and depicts coordinates of the vehicle and an identified problem). Additionally or alternative, the enterprise user device 105 may direct an autonomous vehicle control system (e.g., corresponding to a service vehicle), to autonomously route a service vehicle to a location of the damaged vehicle.

As another example, the enterprise user device 105 may be used by an employee of an enterprise organization (e.g., an insurance institution, or the like). For example, the enterprise user device 105 may be used to identify rates, premiums, discounts, or the like based on a user's driving history. In these instances, the kinetic insights and vibration analysis platform 102 may use the vibration/frequency data to determine a driving score, which may be sent to the enterprise user device 105 and displayed (e.g., for the purpose of identifying rates, premiums, discounts, or the like). For example, the kinetic insights and vibration analysis platform 102 may identify, based on the vibration/frequency data, that lug nuts on a wheel are loose, and may warn the driver. If the driver continues to drive until the wheel falls off, the kinetic insights and vibration analysis platform 102 may reduce a driving score (e.g., because the driver is increasing the chance of an accident). In contrast, if the wheel falls off, but the kinetic insights and vibration analysis platform 102 identifies that the lug nut came loose within a predetermined period of time (e.g., within a minute, a few seconds, or the like), it may determine that the driver did not have an adequate opportunity to address the vehicle problem (e.g., the loose lug nuts), and might not make an adjustment to the driving score. Further, with regard to this example, if the driver proceeds to a repair shop and has the lug nuts tightened after receiving a warning from the kinetic insights and vibration analysis platform 102, the kinetic insights and vibration analysis platform 102 may improve or increase the driving score (e.g., because the driver is mitigating the chance of an accident). In some instances, in displaying the driving score, the enterprise user device 105 may display a graphical user interface similar to graphical user interface 505, which is shown in FIG. 5.

As yet another example, the enterprise user device 105 may be a computer, tablet, mobile device, or the like at a repair facility (e.g., that may be used by one or more mechanics, technicians, or the like in performing a vehicle repair/diagnosis). In these instances, the enterprise user device 105 may display a re-creation of an event and/or the vehicle problem using the frequency/vibration data and/or other data (e.g., telematics data, vehicle, data, third party source data, or the like). With regard to the re-creation of the event, the kinetic insights and vibration analysis platform 102 may analyze the vibration/frequency data, telematics data, vehicle data, third party source data, or the like to piece together a series of events that occurred (e.g., brake deteriorated over time, the vehicle experienced a collision, and based on the brake deterioration and the vehicle speed the vehicle was unable to stop prior to colliding with another object). For example, the kinetic insights and vibration analysis platform 102 may be a "black box" that may be used to determine what happened before, during, and after a driving event (e.g., an accident). In some instances, the kinetic insights and vibration analysis platform 102 may re-create events using one or more machine learning datasets corresponding to frequency/vibration data, telematics data, vehicle data, third party source data, or the like and corresponding events that have a stored relation to this data within the machine learning datasets. For example, the enterprise user device 105 may display a graphical user interface similar to graphical user interface 605, which is shown in FIG. 6.

At step 213, after identifying the vehicle problem at step 208, the kinetic insights and vibration analysis platform 102 may generate one or more second mitigation commands based on the vibration and/or frequency data. For example, the kinetic insights and vibration analysis platform 102 may generate one or more commands directing client device 103 to perform one or more actions. For example, the kinetic insights and vibration analysis platform 102 may generate one or more commands directing the client device 103 to display one or more displayable elements such as: an indication of a nearest service facility with capabilities to address the identified vehicle problem, navigational guidance directing a driver to the nearest service facility, a recommendation that a driver should proceed directly to the service facility, a predicted amount of time before something more serious occurs, an estimated repair cost, alerts, a driving score, or the like. In these instances, the kinetic insights and vibration analysis platform 102 may generate one or more commands directing client device 103 to determine one or more of the displayable elements described above. In other instances, the kinetic insights and vibration analysis platform 102 may predict or otherwise determine one or more of these displayable elements and may direct the client device 103 to display a graphical interface accordingly.

At step 214, the kinetic insights and vibration analysis platform 102 may establish a connection with client device 103. For example, the kinetic insights and vibration analysis platform 102 may establish a second wireless data connection to link the kinetic insights and vibration analysis platform 102 to the client device 103 (e.g., in preparation for transmitting the one or more second mitigation commands). In some instances, the kinetic insights and vibration analysis platform 102 may identify whether a connection is already established with the client device 103. If a connection is already established with the client device 103, the kinetic insights and vibration analysis platform 102 might not re-establish the connection. If a connection is not already established, the kinetic insights and vibration analysis platform 102 may establish the second wireless data connection as described herein. In still other instances, the kinetic insights and vibration analysis platform 102 and the client device 105 may be included in the same computing device or chip such that establishing a connection between the two components may not be necessary.

Figure 2D:
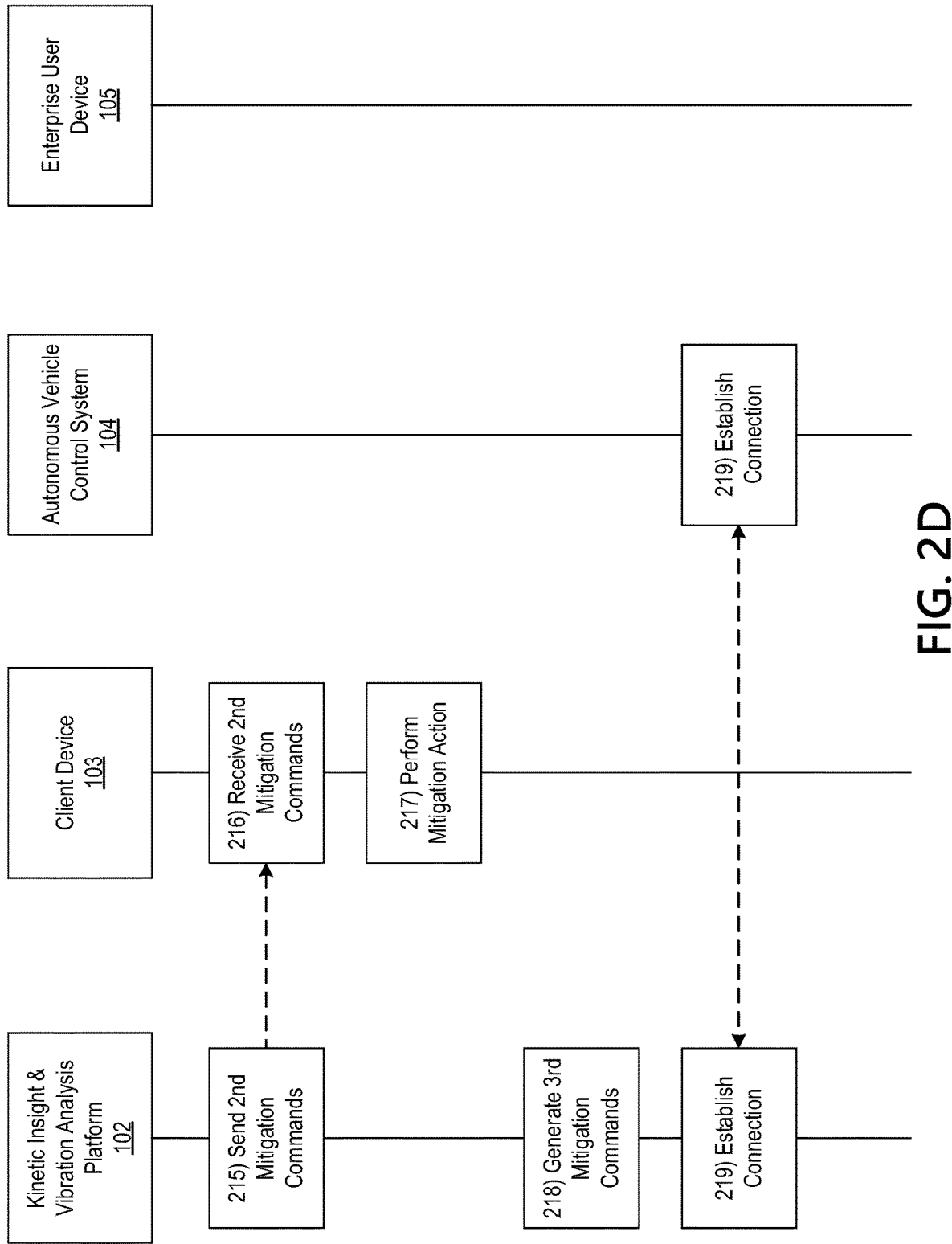

Referring to FIG. 2D, at step 215, the kinetic insights and vibration analysis platform 102 may transmit the one or more second mitigation commands to the client device 103. In some instances, the kinetic insights and vibration analysis platform 102 may transmit the one or more second mitigation commands to the client device 103 via the communication interface 113 and while the second wireless data connection is established.

At step 216, the client device 103 may receive the one or more second mitigation commands sent at step 215. In some instances, the client device 103 may receive the one or more second mitigation commands while the second wireless data connection is established.

At step 217, the client device 103 may perform a mitigation action in response to the one or more second mitigation commands received at step 216. For example, in some instances, the client device 103 may be an on-board integrated vehicle display, a mobile device, a tablet, or the like that may be viewed by the driver within the vehicle. In these instances, the client device 103 may display a graphical user interface indicating one or more displayable elements such as: an indication of a nearest service facility with capabilities to address the identified vehicle problem, navigational guidance directing a driver to the nearest service facility, a recommendation that a driver should proceed directly to the service facility, a predicted amount of time before something more serious occurs (e.g., "your tire has 50 more miles on it before the probability of failure exceeds a predetermined failure threshold—please replace tire within one week," or the like), an estimated repair cost, alerts, a driving score, or the like. In some instances, the client device 103 may determine these displayable elements. In other instances, the kinetic insights and vibration analysis platform 102 may determine the displayable elements using one or more machine learning datasets corresponding to frequency/vibration data, telematics data, vehicle data, third party source data, or the like and corresponding information that has a stored relation to this data within the machine learning datasets. In some instances, in performing the mitigation action at step 217, the client device 103 may display a graphical user interface similar to graphical user interface 705, which is shown in FIG. 7.

In some instances, based on the vibration and/or frequency data the kinetic insights and vibration analysis platform 102 may predict a vehicle event. In some instances, the kinetic insights and vibration analysis platform 102 may predict the vehicle event based, at least in part, on additional data as well. For example, the kinetic insights and vibration analysis platform 102 may determine that the vehicle is fishtailing and that there is ice on the road and that certain vehicle systems should be deployed to prevent the vehicle from flipping. In these instances, the one or more second mitigation commands may direct the client device 103 to display an alert, notification, or the like instructing the driver to deploy the identified system, and the client device 103 may cause display of a graphical user interface accordingly (e.g., to mitigate risk of an accident in advance). Additionally or alternatively, in this example, the kinetic insights and vibration analysis platform 102 may determine a probability of the vehicle event (e.g., vehicle flipping) occurring. If the probability of the vehicle event occurring is greater than a predetermined vehicle event threshold, the kinetic insights and vibration analysis platform 102 may direct a vehicle control system (e.g., autonomous vehicle control system 104 or a non-autonomous vehicle control system) to autonomously engage the identified system, which may cause the vehicle control system to engage the identified system accordingly and/or generate an indication that the identified system should be manually engaged.

At step 218, after identifying the vehicle problem at step 208, the kinetic insights and vibration analysis platform 102 may generate one or more third mitigation commands based on the vibration and/or frequency data. For example, the kinetic insights and vibration analysis platform 102 may generate one or more commands directing autonomous vehicle control system 104 to perform one or more actions (e.g., autonomously route a service vehicle to a location of the vehicle, autonomously route the vehicle to a repair service location, or the like).

At step 219, the kinetic insights and vibration analysis platform 102 may establish a connection with autonomous vehicle control system 104. For example, the kinetic insights and vibration analysis platform 102 may establish a third wireless data connection with the autonomous vehicle control system 104 to link the kinetic insights and vibration analysis platform 102 to the autonomous vehicle control system 104 (e.g., in advance of transmitting third mitigation commands). In some instances, the kinetic insights and vibration analysis platform 102 may identify whether or not a connection is already established with the autonomous vehicle control system 104. If a connection is already established, the kinetic insights and vibration analysis platform 102 might not re-establish the third wireless data connection. If a connection is not already established, the kinetic insights and vibration analysis platform 102 may establish the third wireless data connection as described herein. In still other instances, the kinetic insights and vibration analysis platform 102 and the autonomous vehicle control system 104 may be included in the same computing device or chip such that establishing a connection between the two components may not be necessary.

Figure 2E:
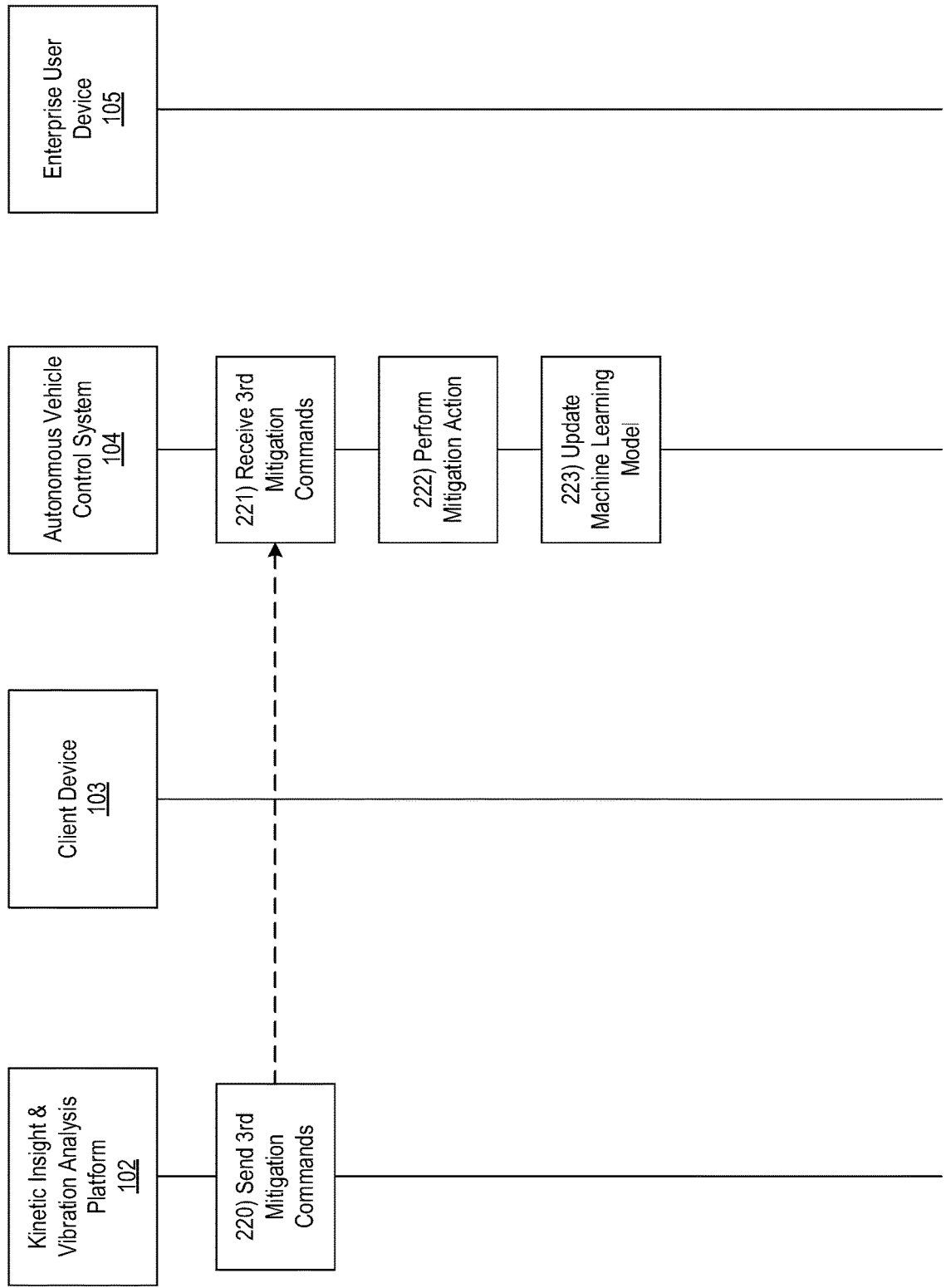

Referring to FIG. 2E, at step 220, the kinetic insights and vibration analysis platform 102 may transmit the one or more third mitigation commands to the autonomous vehicle control system 104. In some instances, the kinetic insights and vibration analysis platform 102 may transmit the one or more third mitigation commands to the autonomous vehicle control system 104 via the communication interface 113 and while the third wireless data connection is established.

At step 221, the autonomous vehicle control system 104 may receive the one or more third mitigation commands from the kinetic insights and vibration analysis platform 102. For example, the autonomous vehicle control system 104 may receive the one or more third mitigation commands while the third wireless data connection is established.

At step 222, the autonomous vehicle control system 104 may perform one or more actions in response to the one or more third mitigation commands received at step 221. For example, the autonomous vehicle control system 104 may be integrated into a service vehicle and may autonomously route the service vehicle to a location of the vehicle. As another example, the autonomous vehicle control system 104 may be integrated into the vehicle and may autonomously route the vehicle to a repair service. In these instances, the autonomous vehicle control system 104 and/or the kinetic insights and vibration analysis platform 102 may select the repair service based on a proximity to the vehicle (e.g., select the closest service) and/or capabilities of the repair service (e.g., capable of fixing the vehicle problem).

It should be understood that the first, second, and third mitigation commands described herein may occur independent of each other. For example, in some instances, the kinetic insights and vibration analysis platform 102 may transmit the first and second mitigation commands, but not the third mitigation commands (e.g., based on a determination that neither the vehicle, nor a corresponding service vehicle, include an autonomous vehicle control system 104, or the like). Alternatively, the kinetic insights and vibration analysis platform 102 may transmit a single set of mitigation commands (e.g., only the first mitigation commands, or the like). In some instances, the kinetic insights and vibration analysis platform 102 may select commands to transmit based on one or more thresholds. For example, the kinetic insights and vibration analysis platform 102 may identify a vehicle damage score, and if the vehicle damage score exceeds a predetermined threshold, may transmit commands to the autonomous vehicle control system 104 to autonomously route the vehicle to a repair shop. In this example, the kinetic insights and vibration platform 102 may generate commands to display a warning at the client device 103 if the vehicle damage score does not exceed the predetermined threshold. Such implementation of thresholds should be understood to apply to any variations of the first, second, or third mitigation commands.

At step 223, the kinetic insights and vibration analysis platform 102 may update the machine learning model, used at step 208, to analyze the vibration and/or frequency data. For example, the kinetic insights and vibration analysis platform 102 may reinforce the existing machine learning model if the kinetic insights and vibration analysis platform 102 correctly identified the vehicle problem. In contrast, if the kinetic insights and vibration analysis platform 102 incorrectly identified the vehicle problem, the kinetic insights and vibration analysis platform 102 may modify the machine learning model to reflect the incorrect analysis. In some instances, the kinetic insights and vibration analysis platform 102 may determine whether the vehicle problem was correctly identified based on information received from the client device 103 and/or enterprise user device 105 (e.g., that may have been input by users of the client device 103 and/or enterprise user device 105).

In some instances, the kinetic insights and vibration analysis platform 102 might not have been able to recognize the vibration and/or frequency data at step 208. In these instances, once the vehicle is manually diagnosed, diagnostic information about the vehicle problem or lack thereof may be sent/transmitted from the client device 103 to the kinetic insights and vibration analysis platform 102, which may update the machine learning model to include the diagnostic information stored in a relational manner to its corresponding vibration and/or frequency data.

Accordingly, one or more aspects of the systems and methods described herein may be used to address technical difficulties associated with preemptive diagnosis of vehicle components that might not otherwise be monitored by an electric sensor. First, by analyzing vehicle dynamics at a vehicle itself, one or more of the systems and methods described herein enable on board computation, and event re-creation from data stored on board. In doing so, one or more of the systems and methods described herein may reduce computation times and conserve network bandwidth by performing local computation instead of transmitting data to a backend server for analysis. In addition, one or more of the systems and methods described herein enable diagnosis of vehicle problems based on vibration and/or frequency data from vehicle components that might not otherwise be monitored (e.g., by an electrical sensor), and may use such data to improve accuracy of vehicle diagnosis and to provide pre-emptive failure alerts and/or other ancillary system control processes.

It should be understood that the steps described in the illustrative event sequence may be performed in any order without departing from the scope of the disclosure.

Figure 3:
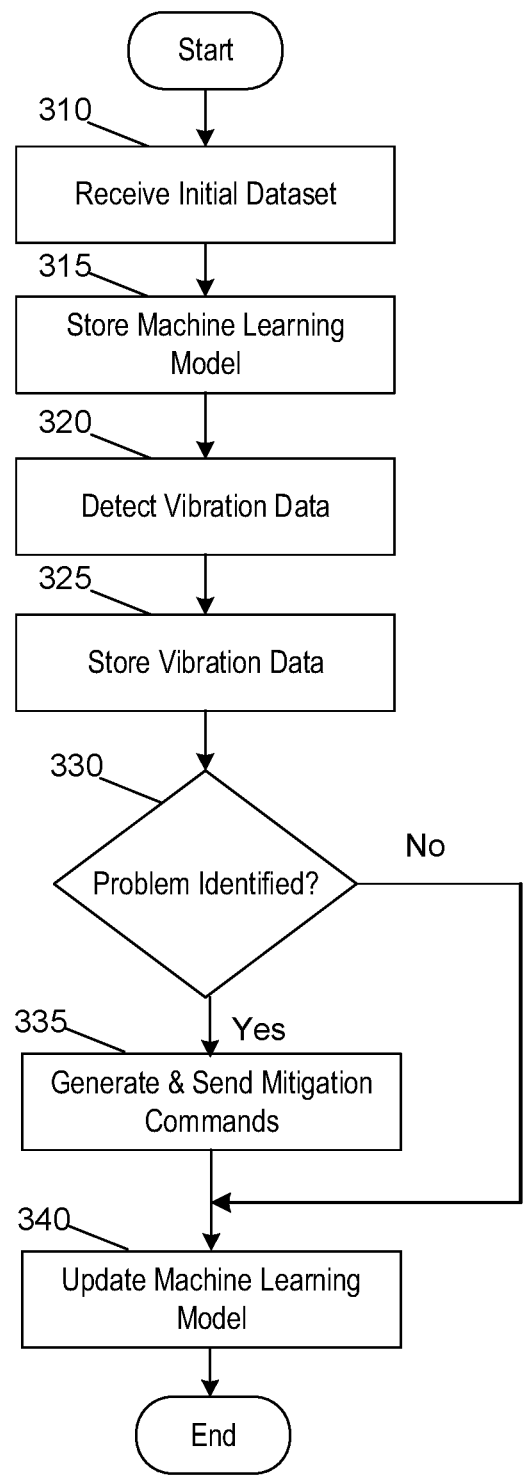
FIG. 3 depicts an illustrative method for implementing improved machine learning techniques for on-board vehicle diagnostics and ancillary device control.

FIG. 3 depicts an illustrative method for implementing improved machine learning techniques for on-board vehicle diagnostics and ancillary device control in accordance with one or more example embodiments. Referring to FIG. 3, at step 310, a computing platform having at least one processor, a communication interface, and memory may receive an initial dataset, from an enterprise user device, including vehicle vibration/frequency data and corresponding vehicle problems that were identified. At step 315, based on the initial dataset, the computing platform may store a machine learning model that may be used to identify vehicle problems based on identified vibration/frequency data. At step 320, the computing platform may detect vibration/frequency data at a vehicle into which the computing platform is integrated. At step 325, the computing platform may store the vibration/frequency data. At step 330, the computing platform may analyze the detected vibration/frequency data using the machine learning model and identify whether or not a problem was identified. If a problem was not identified, the computing platform may proceed to step 335. If a problem was identified, the computing platform may proceed to step 340.

At step 335, the computing platform may generate and transmit one or more mitigation commands directing another computing device (e.g., an enterprise user device, client device, autonomous vehicle control system, or the like) to perform one or more actions in response to the identified problem. At step 340, the computing platform may update the machine learning model based on the detected vibration data, whether or not a problem was identified, and if so, what the identified problem was.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A kinetic insights computing device, comprising:
   at least one processor;
   a communication interface communicatively coupled to the at least one processor; and
   memory storing computer-readable instructions that, when executed by the at least one processor, cause the computing device to:
   receive vibration data corresponding to a vehicle component of a particular vehicle;
   identify, using one or more machine learning models and based on the vibration data, a vehicle problem corresponding to the vibration data; and
   after identifying the vehicle problem and determining that a severity associated with the vehicle problem is above a first threshold, communicate an indication of the vehicle problem to a client device, wherein the indication specifies an amount of time predicted by the one or more machine learning models before the vehicle problem will cause one or more secondary problems with the particular vehicle; and
   after identifying the vehicle problem and determining that the severity associated with the vehicle problem is above a second threshold, transmit, to an autonomous vehicle control system, one or more first commands directing the autonomous vehicle control system to autonomously navigate an autonomous vehicle based on the identified vehicle problem to a location of the particular vehicle, wherein transmitting the one or more first commands causes the autonomous vehicle control system to autonomously navigate the autonomous vehicle based on the one or more first commands to the location of the particular vehicle.

2. The kinetic insights computing device of claim 1, wherein the memory stores additional computer-readable instructions that, when executed by the at least one processor, cause the computing device to:
   receive frequency-based data corresponding to the vehicle component, wherein the vehicle problem is identified based, at least in part, on the frequency-based data.

3. The kinetic insights computing device of claim 1, wherein the vehicle component is not monitored by an electrical sensor.

4. The kinetic insights computing device of claim 1, wherein the computing device:
   is located in a fixed, stationary location on the vehicle, and
   is powered by the vehicle.

5. The kinetic insights computing device of claim 1, wherein the memory stores additional computer-readable instructions that, when executed by the at least one processor, cause the computing device to:
   receive, from one or more vehicle sensors of the vehicle, telematics data, wherein identifying the vehicle problem is based, at least in part on the telematics data.

6. The kinetic insights computing device of claim 1, wherein the memory stores additional computer-readable instructions that, when executed by the at least one processor, cause the computing device to:

identify a service facility, wherein the service facility is identified based on one or more of: a proximity of the service facility to a vehicle corresponding to the vehicle component or capability of the service facility to address the vehicle problem and wherein transmitting the one or more first commands causes the autonomous vehicle control system to autonomously navigate the vehicle to the service facility.

7. The kinetic insights computing device of claim 1, wherein the memory stores additional computer-readable instructions that, when executed by the at least one processor, cause the computing device to:
transmit, to an enterprise user device, one or more second commands directing the enterprise user device to cause display of a user interface indicating a re-creation of a vehicle event, wherein transmitting the one or more second commands directing the enterprise user device to cause display of the user interface indicating the re-creation of the vehicle event causes the enterprise user device to cause display of the user interface indicating the re-creation of the vehicle event, wherein the re-creation of the vehicle event is determined based on the vibration data.

8. The kinetic insights computing device of claim 1, wherein the memory stores additional computer-readable instructions that, when executed by the at least one processor, cause the computing device to:
update the one or more machine learning models with training data based on the vibration data and the vehicle problem.

9. A non-transitory computer-readable medium having stored thereon, which when executed by one or more processors of a computing device, causes the computing device to perform operations comprising:
receiving vibration data corresponding to a vehicle component of a particular vehicle;
identifying, using one or more machine learning models based on the vibration data, a vehicle problem corresponding to the vibration data;
after identifying the vehicle problem and determining that a severity associated with the vehicle problem is above a first threshold, communication an indication of the vehicle problem to a client device, wherein the indication specifies an amount of time predicted by the one or more machine learning models before the vehicle problem will cause one or more secondary problems with the particular vehicle; and
after identifying the vehicle problem and determining that the severity associated with the vehicle problem is above a second threshold, transmitting, to an autonomous vehicle control system, one or more first commands directing the autonomous vehicle control system to autonomously navigate an autonomous vehicle based on the identified vehicle problem to a location of the particular vehicle, wherein transmitting the one or more first commands causes the autonomous vehicle control system to autonomously navigate the autonomous vehicle based on the one or more first commands to the location of the particular vehicle.

10. The non-transitory computer-readable medium of claim 9, wherein execution of instructions by the one or more processors causes the computing device to perform operations comprising:
receiving frequency-based data corresponding to the vehicle component, wherein the vehicle problem is identified based, at least in part, on the frequency-based data.

11. The non-transitory computer-readable medium of claim 9, wherein the vehicle component is not monitored by an electrical sensor.

12. The non-transitory computer-readable medium of claim 9, wherein the computing device:
is located in a fixed, stationary location on the vehicle, and
is powered by the vehicle.

13. The non-transitory computer-readable medium of claim 9, wherein execution of instructions by the one or more processors causes the computing device to perform operations comprising:
receiving, from one or more vehicle sensors of the vehicle, telematics data, wherein identifying the vehicle problem is based, at least in part of the telematics data.

14. The non-transitory computer-readable medium of claim 9, wherein execution of instructions by the one or more processors causes the computing device to perform operations comprising:
identifying a service facility, wherein the service facility is identified based on one or more of: a proximity of the service facility to a vehicle corresponding to the vehicle component or capability of the service facility to address the vehicle problem and wherein transmitting the one or more first commands causes the autonomous vehicle control system to autonomously navigate the vehicle to the service facility.

15. The non-transitory computer-readable medium of claim 9, wherein execution of instructions by the one or more processors causes the computing device to perform operations comprising:
transmitting, to an enterprise user device, one or more second commands directing the enterprise user device to cause display of a user interface indicating a re-creation of a vehicle event, wherein transmitting the one or more second commands directing the enterprise user device to cause display of the user interface indicating the re-creation of the vehicle e vent causes the enterprise user device to cause display of the user interface indicating the re-creation of the vehicle event, wherein the re-creation of the vehicle event is determined based on the vibration data.

16. The non-transitory computer-readable medium of claim 9, wherein execution of instructions by the one or more processors causes the computing device to perform operations comprising:
updating the one or more machine learning models with training data based on the vibration data and the vehicle problem.

17. A computer-implemented method comprising:
receiving, by a computing device, vibration data corresponding to a vehicle component of a particular vehicle;
identifying, by the computing device and using one or more machine learning models and based on the vibration data, a vehicle problem corresponding to the vibration data;
after identifying the vehicle problem and determining that a severity associated with the vehicle problem is above a first threshold, communicating, by the computing device, an indication of the vehicle problem to a client device, wherein the indication specifies an amount of time predicted by the one or more machine learning models before the vehicle problem will cause one or more secondary problems with the particular vehicle; and after identifying the vehicle problem and determining that the severity associated with the vehicle problem is above a second threshold, transmitting, by the computing device and to an autonomous vehicle control system, one or more first commands directing the autonomous vehicle control system to autonomously navigate an autonomous vehicle based on the identified vehicle problem to a location of the particular vehicle, wherein transmitting the one or more first commands causes the autonomous vehicle control system to autonomously navigate the autonomous vehicle based on the one or more first commands to the location of the particular vehicle.

18. The computer-implemented method of claim 17, further comprising:
receiving, by the computing device, frequency-based data corresponding to the vehicle component, wherein the vehicle problem is identified based, at least in part, on the frequency-based data.

19. The computer-implemented method of claim 17, wherein the vehicle component is not monitored by an electrical sensor.

20. The computer-implemented method of claim 17, wherein the computing device:
is located in a fixed, stationary location on the vehicle, and is powered by the vehicle.

21. The computer-implemented method of claim 17, further comprising:
receiving, by the computing device and from one or more vehicle sensors of the vehicle, telematics data, wherein identifying the vehicle problem is based, at least in part on the telematics data.

\* \* \* \* \*